United States Patent
Frank et al.

(10) Patent No.: US 8,855,875 B2
(45) Date of Patent: Oct. 7, 2014

(54) PEDAL MAP SHIFT

(75) Inventors: Bobbie Frank, Eskilstuna (SE); Reno Filla, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 688 days.

(21) Appl. No.: 13/128,009

(22) PCT Filed: Nov. 21, 2008

(86) PCT No.: PCT/SE2008/000654
§ 371 (c)(1),
(2), (4) Date: May 6, 2011

(87) PCT Pub. No.: WO2010/059082
PCT Pub. Date: May 27, 2010

(65) Prior Publication Data
US 2011/0218075 A1    Sep. 8, 2011

(51) Int. Cl.
| | | |
|---|---|---|
| G06F 19/00 | (2011.01) |
| B60W 10/08 | (2006.01) |
| E02F 9/20 | (2006.01) |
| B60K 6/46 | (2007.10) |
| B60W 10/06 | (2006.01) |
| B60W 30/182 | (2012.01) |
| B60W 30/18 | (2012.01) |
| B60W 20/00 | (2006.01) |

(52) U.S. Cl.
CPC ............ *B60K 6/46* (2013.01); *B60W 2540/103* (2013.01); *B60W 10/08* (2013.01); *E02F 9/2062* (2013.01); B60W 2520/06 (2013.01); B60W 10/06 (2013.01); Y02T 10/6286 (2013.01); *B60W 30/182* (2013.01); Y02T 10/6217 (2013.01); B60W 2710/0644 (2013.01); B60W 2510/1005 (2013.01); *B60W 30/18036* (2013.01); B60W 2540/10 (2013.01); B60W 20/00 (2013.01); B60L 2240/486 (2013.01)
USPC ............... 701/54; 701/55; 477/107; 477/110; 477/111

(58) Field of Classification Search
USPC ........................ 701/54–55; 477/107, 110, 111
See application file for complete search history.

(56) References Cited

U.S. PATENT DOCUMENTS

| | | |
|---|---|---|
| 5,412,294 A | 5/1995 | Anzai |
| 6,220,219 B1 | 4/2001 | Wadas et al. |

(Continued)

FOREIGN PATENT DOCUMENTS

| | | |
|---|---|---|
| EP | 1820908 A | 8/2007 |
| JP | H0614404 A | 1/1994 |
| JP | 2002335602 A | 11/2002 |

OTHER PUBLICATIONS

International Search Report for corresponding International Application PCT/SE2008/000654.

(Continued)

*Primary Examiner* — Derek D Knight
(74) *Attorney, Agent, or Firm* — WRB-IP LLP

(57) ABSTRACT

A method is provided for controlling a prime mover adapted to drive at least one ground engaging element of a working machine. The method includes receiving an operator control input indicative of the control of the prime mover and determining at least one operation signal in response to the operator control input, which operation signal is sent for controlling the prime mover. The method also includes receiving a operating state input indicative of an operating state of the machine and selecting a control mode from at least one speed control mode in which the determined operational signal comprises a desired speed of the prime mover and at least one torque control mode in which the determined operational signal comprises a desired torque of the prime mover in response to the operating state input.

17 Claims, 14 Drawing Sheets

(56) References Cited

U.S. PATENT DOCUMENTS

| | | |
|---|---|---|
| 8,744,716 B2 * | 6/2014 | Kar et al. .................... 701/110 |
| 2005/0255963 A1 | 11/2005 | Hsich et al. |
| 2005/0274555 A1 | 12/2005 | Betz et al. |
| 2007/0026997 A1 | 2/2007 | Tohta et al. |
| 2008/0220937 A1 | 9/2008 | Nozaki et al. |
| 2010/0280722 A1 * | 11/2010 | Frank et al. .................... 701/55 |

OTHER PUBLICATIONS

International Preliminary Report on Patentability for corresponding International Application PCT/SE2008/000654.

Supp. European Search Report (Jun. 10, 2014) for corresponding European App. EP 08 87 8304.

* cited by examiner

PEDAL MAP SHIFT

BACKGROUND AND SUMMARY

The present invention relates to a method for controlling at least one prime mover adapted to drive at least one ground engaging element of a working machine and the working machine.

The invention is applicable on working machines within the field of industrial construction machines, in particular wheel loaders. Thus, the invention will be described with respect to wheel loaders. However, the invention is by no means limited to a particular working machine. On the contrary, the invention may be used in a plurality of heavy working machines, e.g. articulated haulers, trucks, bulldozers and excavators.

A wheel loader is usually provided with an internal combustion engine, a traction system for operating the loader on the ground and a hydraulic system for operating an attachment. The machine normally comprises a front body section pivoting with a rear body section and a loading unit with a linkage and an attachment in the form of a bucket (or fork or log grapple) fitted on the linkage. The hydraulic system operates the linkage and the attachment. By operating the hydraulic system, the loader can load the bucket with for instance gravel. The system may be electronically and/or hydraulically controlled. Blends between an all-mechanic-hydraulic control and all-electronic control are common and known to persons skilled in the art.

The traction system operates the working machine on the ground. The power from the engine is fed to a torque converter, which further feeds the power via transmission axles to ground engaging elements, in form of wheels. Since the wheels acts on the ground through penetration and traction, there will be a traction force coupling between the engine and the ground.

The internal combustion engine normally used in wheel loaders is controlled by an engine control unit (E-ECU), which controls the engine on the basis of an operator control input. The operator control input is a voltage or current value created when the operator pushes the accelerator pedal. The operator control input forms a desired value for the engine speed (in % or an interval such as 0 to 1). The E-ECU could be a separate unit or functionality within a vehicle ECU that controls the complete operation of the loader. The vehicle ECU makes sure to control the engine on the basis of the total power need of the loader.

Today the internal combustion engine in the wheel loader is variable-speed controlled. This means that the operation signal indicates a certain desired value for the speed. The E-ECU internally calculates a required value for the torque to make sure the engine holds the speed. When the load on the wheel loader changes, the E-ECU controls the actual engine speed by changing the required value for the torque.

In future wheel loaders it might be advantageous to use series hybrid systems where the internal combustion engine drives a generator to charge a battery. A plurality of electric motors, powered by the battery, then provides power to the hydraulic system and the traction system. The traction system of such loaders has no torque converter.

In a conventional wheel loader, the torque converter's characteristics and its elasticity gives the operator an indication of traction force at low vehicle speeds and constant traction resistance, e.g. when filling the bucket. In a hybrid system without torque converter, it is desirable to still give the operator such an indication of traction force. Otherwise, in a variable speed-controlled machine the operator's command of the gas pedal will result in that the wheels skids, with a negative experience for the operator. Moreover, since the wheels skid, they will wear out rapidly, which is negative for the operating economy of the vehicle.

The same problem will apply also to wheel loaders having a parallel hybrid system and a traction system with no torque converter. In such a system, the internal combustion engine and the electric motor both power the hydraulic system and the traction system.

It will also apply to conventional non-hybrid loader, powered by an internal combustion, and having a traction system with no torque converter.

It is desirable to solve the above mentioned problem by improving the control of a prime mover in a working machine without a torque converter.

An aspect of the present invention relates to a method for controlling a prime mover adapted to drive at least one ground engaging element of a working machine. The method comprises the steps of: (1) receiving an operator control input indicative of the control of the prime mover and (2) determining at least one operation signal in response to the operator control input, which operation signal is sent for controlling the prime mover.

What particularly characterizes the method is the steps of: (3) receiving a operating state input indicative of an operating state of the machine and (4) selecting a control mode from at least one speed control mode in which the determined operational signal comprises a desired speed of the prime mover and at least one torque control mode in which the determined operational signal comprises a desired torque of the prime mover in response to the operating state input.

With the present method, the operability of working machines, e.g. a wheel loader, that does not have a torque converter, is improved. By controlling the prime mover either by speed or by torque, depending on the situation, the machine can be adapted for different operating states and thereby the operability of the machine is improved.

The control mode may shift from the speed control mode to the torque control mode when the machine switches to a kick-down operating state and shift from the torque control mode to the speed control mode when the machine switches to a reverse gear operating state. The method may furthermore select between one of a plurality of speed control modes and a plurality of torque control modes. Each control mode may comprise at least one control map for determining the operation signal. A shift between control modes on the basis of the kick-down or reverse means that the machine can adapt to the operating conditions on the basis of these shifts to improve the operability. Using control maps improves this operability.

In the torque control mode the actual value for the speed of the prime mover at least depends on the load acting on the machine, which improves the feedback to the operator.

The prime mover may be an internal combustion engine or an electric motor, where the electric motor may be part of a series hybrid system. As an alternative, the prime mover is a parallel hybrid system with an internal combustion engine and an electric motor connected in parallel. The selected control mode may therefore control the internal combustion engine and/the electric motor. It is often that prime movers comprises an electric motor and is not connected to a torque converter. The use of this method in such prime movers significantly improves the operability.

The operating state input may be determined by the operator's actuation of a control device for selection of different operating states, wherein this control device could consist of or comprise a kick-down button. As an alternative the operating state input is determined automatically based on at least one detected operating condition. An automatic determination can eliminate the need for an operator input like a kickdown button or gear lever while a manually actuated control device is preferred by some operators.

Another aspect of the present invention relates to an engine control unit or a hybrid control unit being adapted to perform any of the method steps according to the method noted above.

BRIEF DESCRIPTION OF THE DRAWINGS

In the following text the invention will be described in detail with reference to the attached drawings. These drawings are used for illustration only and do not in any way limit the scope of the invention.

DETAILED DESCRIPTION

Figure 1:
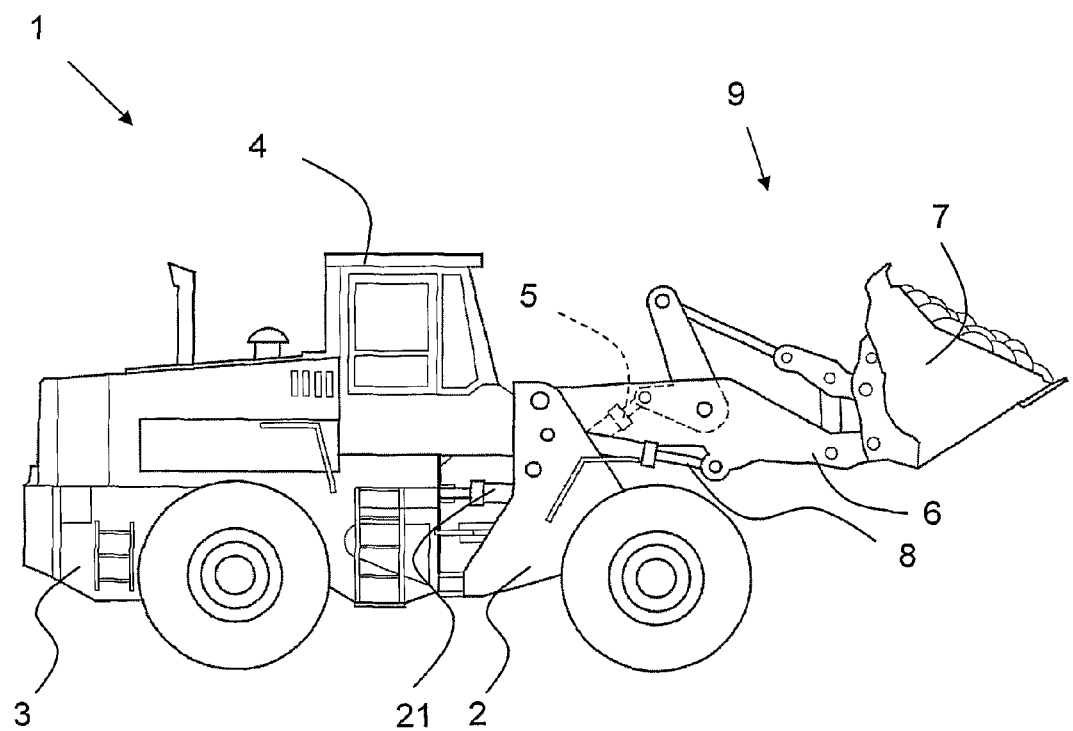
FIG. 1 illustrates a wheel loader.

The invention will now be described in detail with reference to embodiments described in the detailed description and shown in the drawings. The embodiments of the invention with further developments and described in the following are to be regarded only as examples and are in no way to limit the scope of the protection provided by the patent claims.

The invention relates to a method, for controlling at least one prime mover adapted to drive at least one ground engaging element of a working machine and the working machine. The working machine described in the following is adapted for performing the method steps described in the method according to the claims. It should therefore be understood by a person skilled in the art that the method is also disclosed in the detailed description FIG. 1 shows a working machine 1 in the form of a wheel loader. The body of the working machine 1 comprises a front body section 2 and a rear body section 3. The rear body section 3 comprises a cab 4. The body sections 2, 3 are connected to each other in such a way that they can pivot. A pair of steering cylinders 21 is provided for steering the wheel loader. The working machine 1 comprises loading unit 9 for handling material or objects. The loading unit 9 comprises a linkage 6 and an attachment 7 in the form of a bucket (or fork or log grapple) fitted on the linkage. A first end of the linkage 6 is pivotally connected to the front machine section 2. The attachment 7 is connected to a second end of the linkage 6.

The loading unit 9 can be raised and lowered relative to the front section 2 of the machine by means of two second actuators in the form of two hydraulic cylinders 8, each of which is connected at one end to the front machine section 2 and at the other end to the linkage 6. The bucket 7 can be tilted relative to the linkage 6 by means of a third actuator in the form of a hydraulic cylinder 5, which is connected at one end to the front machine section 2 and at the other end to the bucket 7 via one or several links belonging to the linkage system. The working machine 1 has a drive train that will be described later.

The hydraulic system operates the loading unit 9. At least one hydraulic pump (driven by a prime mover 10) supplies the hydraulic cylinders 5, 8, 21 with hydraulic fluid. The prime mover could for instance be a conventional internal combustion engine, an electric motor or both as will be described later.

The traction system (also called drive train) operates the working machine on the ground. The power from the torque converter 12 is fed via the transmission and axles 17 to the ground engaging element, in form of wheels 18. Since the wheels acts on the ground through traction 20, there will be a traction force coupling between the prime mover 10 and the ground 19. A transmission control unit (T-ECU) for instance controls the transmission course of events. As is the case for E-ECU, this T-ECU could also be realized as functionality within any other ECU, e.g. the vehicle ECU.

Figure 2:
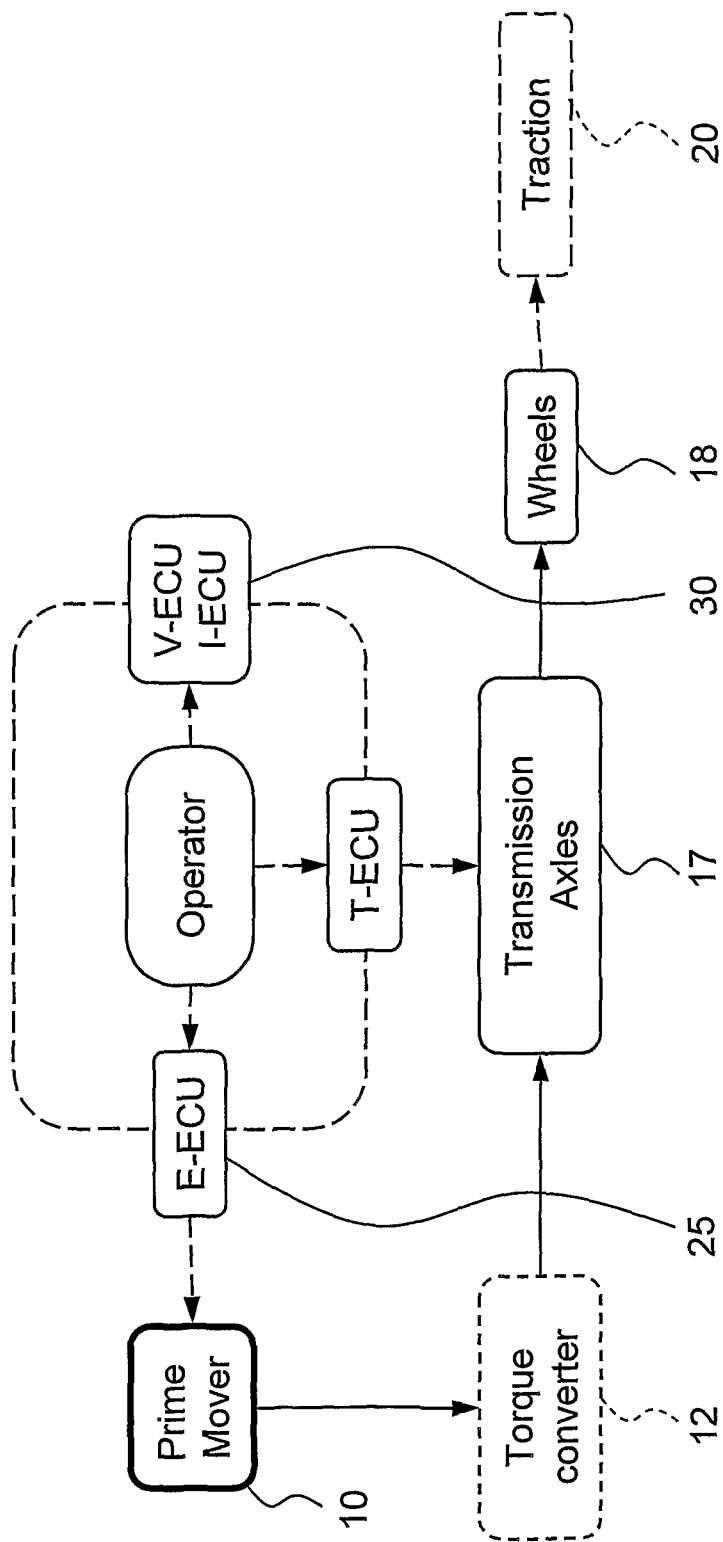
FIG. 2 illustrates the drive train of a wheel loader.

An engine control unit (E-ECU) 25, see FIG. 2, controls the prime mover 10 on the basis of an operator control input. The input is a value that is generated (usually: calculated) in relation to a voltage value, which in its turn is generated by an acceleration pedal (or any similar means) when being operated by the user. The operator control input then corresponds to an angle of an acceleration pedal. The operator control input is indicative of the control of the prime mover 10. Other means replacing the pedal may also be used, such as a button, lever or touch screen.

Each E-ECU is part of the vehicle control system in the working machine. The vehicle control system relates to all the systems of the working machine, such as the control systems for the traction system and the hydraulic system, see FIG. 2. The control units in the working machine can be separate units or functionalities (entities) within a common control system for the working machine. In such a case, the functionalities are program codes stored within the system for controlling a certain part of the working machine.

Among other duties the V-ECU 30 monitors the power need of the working machine. The prime mover 10 needs to provide power to the hydraulic system, the traction system and all auxiliary systems in the machine, and since the V-ECU collects information of the power need it can provide information about the power need to the E-ECU 25. The E-ECU in turn controls the prime mover on the basis of said information.

Figure 3:
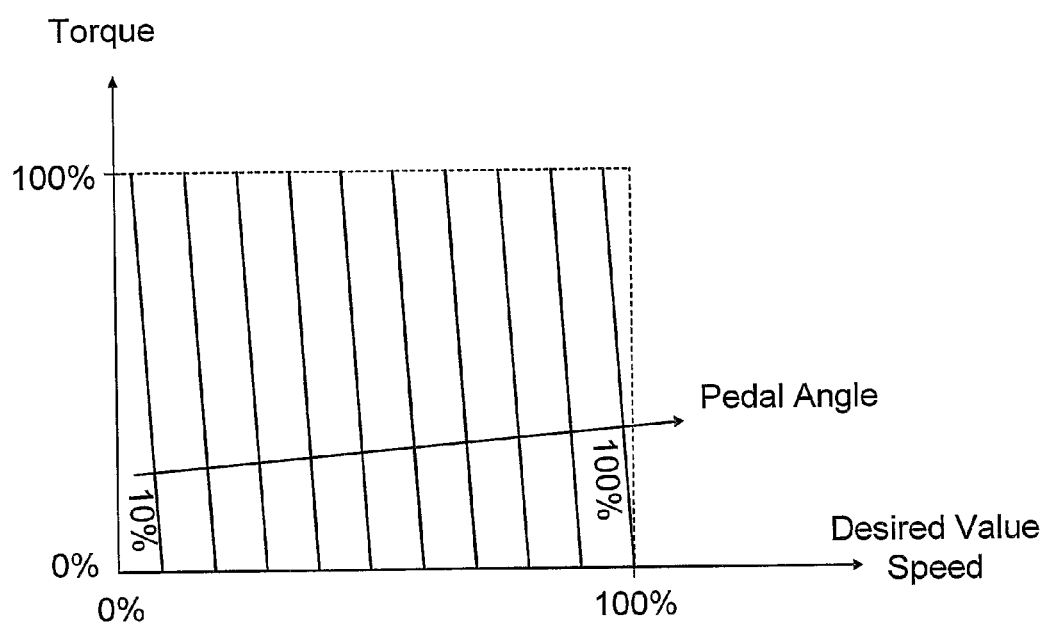
FIG. 3 illustrates a typical mapping of the relationship between the accelerator pedal angle and the engine speed in a variable-speed controlled wheel loader, acknowledging the engine load by the slope of the individual curves (ideally zero or close to).

In today wheel loaders, there is an internal combustion engine which is variable-speed controlled. This means that an operation signal for controlling the engine indicates a certain desired value for the speed. The operation signal is determined in response to the operator control input. The E-ECU calculates a required value for the torque to make sure the engine achieves or holds the desired speed. When the load on the wheel loader changes while the operator keeps the angle of accelerator pedal constant, the E-ECU aims at keeping the current speed by changing the required value for the torque. For reasons of controller stability, one often allows a slight speed deviation for higher torque values. This is illustrated in FIG. 3. Ideally, the lines in the diagram which indicates the relationship between the desired value of the engine speed and the torque for a constant operator control input would be perfectly vertical. Sloping them at a slight angle introduces a certain control error, but makes the controller much more stable.

Figure 8:
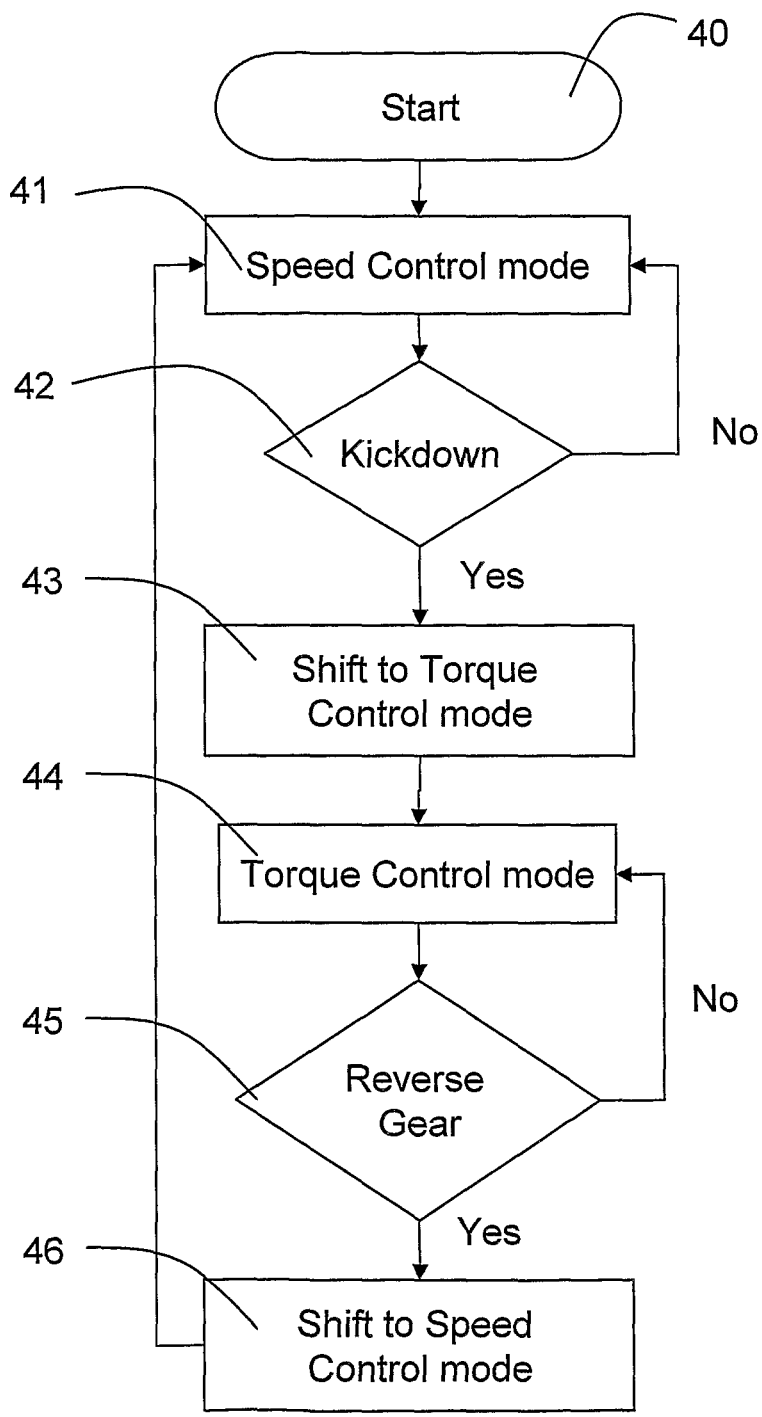
FIG. 8 illustrates a flow chart for the control of the prime mover according to the present invention.

When the torque converter 12 is removed, negative effects as described in the background section are the results. To solve this, FIG. 8 illustrates a method where an operating state input is generated which indicates the operating state of the machine. In response to the input, a control mode is selected. The operating state input may be the activation of kick-down or activation of reverse gear. The mode is selected from at least one speed control mode 41, see FIG. 8, in which the determined operational signal comprises a desired speed of the prime mover and at least one torque control mode 44 in which the determined operational signal comprises a desired torque of the prime mover in response to the operating state input.

Figure 9:
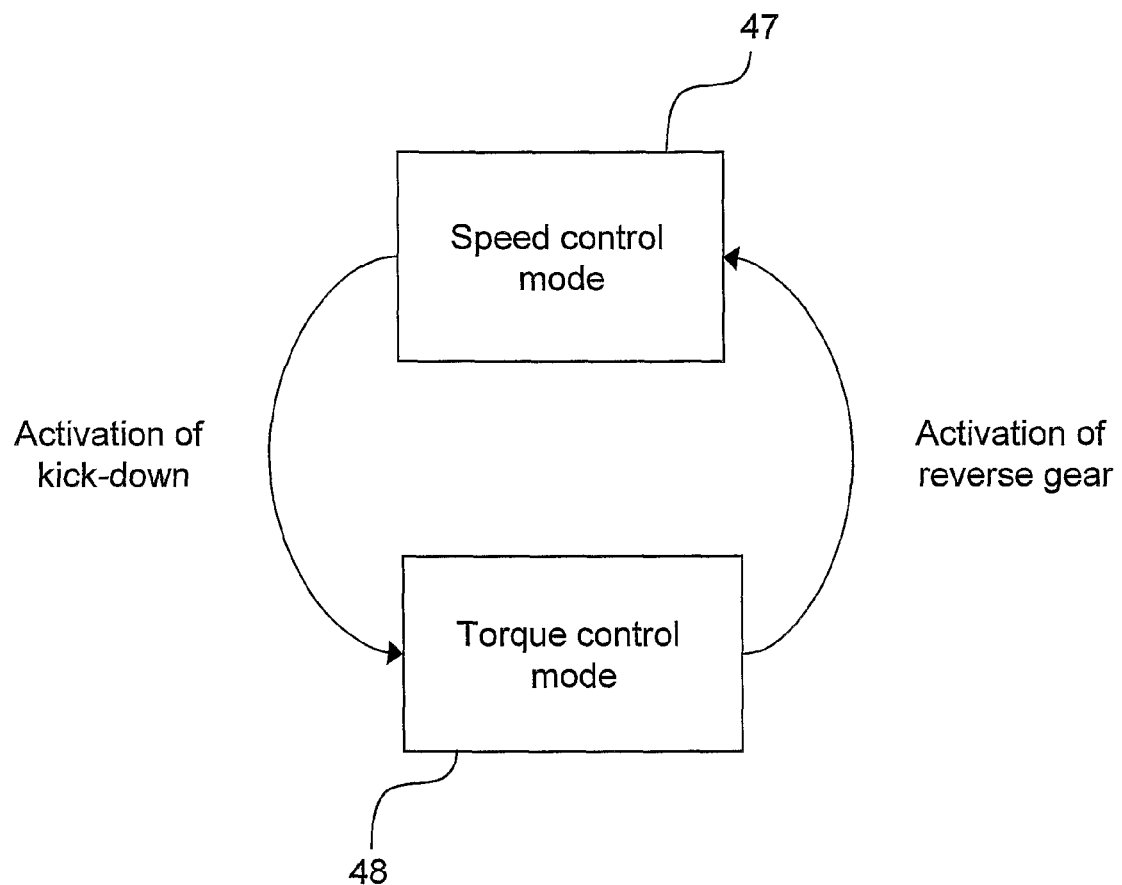
FIG. 9 illustrates the control of the prime mover as a state machine.

For instance the control mode is preferably shifted from the speed control mode to the torque control mode when the operator activates a function like the kick-down, see FIGS. 8 and 9, (which is a forced gear shifting to lowest gear in order to obtain the highest traction force), thus adapting the machine for bucket loading. The kick-down could also be automatically activated by the machine itself when e.g. it is determined that bucket loading is about to begin.

The control mode is preferably shifted from the torque control mode to the speed control mode when the operator chooses a reverse gear, see FIGS. 8 and 9, in order to back away from the bucket loading location (e.g. a gravel pile). Also this could be an automatic function. There are other situations among all possible states of machine operation, where such a transition from speed control mode to torque control mode (or vice versa) are of advantage.

The machine's current operating state is preferably monitored by the V-ECU. The operating state input could for instance be determined by the operator's actuation of a control device for selection of different operating states. Such a control device is for instance a button, a knob or a touch screed control. Is could also be selecting means for a reverse gear. In the case the operating state is a kick-down state, the control device is a kick-down button. In the case the operating state is a reverse gear state, the control device is the gear lever, button or similar means for controlling the transmission.

As an alternative, the operating state input is determined automatically or semi-automatically based on at least one detected operating condition. A detected operating condition is for instance the pressure in a hydraulic cylinder 5. For instance the V-ECU may monitor certain sensors, such as a pressure sensor, and use the sensors in a computer program detect the operating state. Such automatic activation can eliminate the need for an operator input like a kick-down button or gear lever.

There is preferably a selection between one of a plurality of speed control modes and a plurality of torque control modes. Normally, the E-ECU comprises at least one control map for speed control. In the present invention, the wheel loader is also provided with a number of torque control modes suitable for different operating states. Each control mode comprises at least one control map for determining the operation signal.

As mentioned earlier, in an ideal speed control mode the E-ECU tries to keep or achieve the desired speed of the prime mover by changing the generated torque value. For reasons of amongst others controller stability, a slight deviation from the set speed in relation to the current load might be allowed (see FIG. 3).

Figure 7:
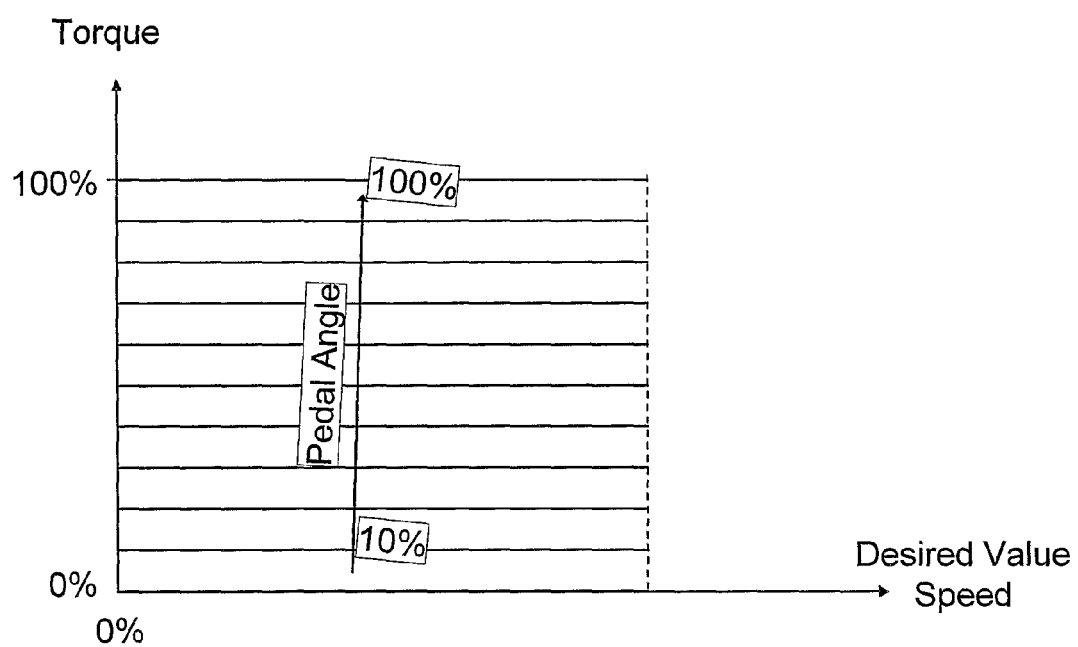
FIG. 7 illustrates a typical mapping of the relationship between the accelerator pedal angle and the engine torque in a torque controlled wheel loader; ideally horizontal lines with zero slope (although other control curves are possible), and thereby, in effect, scaling engine power.

In the torque control mode, the actual value for the speed of the prime mover instead depends on the difference between generated torque (as commanded by the accelerator pedal) and the load acting on the flywheel in the machine. FIG. 7 shows how generated engine torque can be related to the value of the accelerator pedal.

In a machine with a torque converter, generated output torque is a function of slip between converter input (connected to the prime mover) and output (connected to the transmission and then further to axles and wheels). For a given output speed, generated output torque follows input speed. This means that even though the prime mover in a machine with torque converter can be speed controlled, the operator still gets a sense of torque control due to the function of the torque converter. A higher deflection of the accelerator pedal leads to higher speed of the prime mover, which gives a higher input speed into the torque converter and ultimately leads to a higher output torque. In such a situation, the operator senses a clear connection between higher deflection of the accelerator pedal and higher traction force.

For a machine without a torque converter, such a relation needs to be accomplished by other means, which is the main idea of the presented invention.

FIG. 8 illustrates a flow chart which exemplifies the control of the prime mover according to the present invention. In step 41, the wheel loader is in a speed control mode. The method continuously monitors 42 the operating state of the loader. When the kick-down signal is received, the control mode shifts 43 to torque control mode. The loader then operates in torque control mode 44. The operating state is continuously monitored 45 and when a reverse gear is activated, the control mode is again switched 46 to speed control mode. FIG. 9 illustrates the control of the primed mover as a simplified state machine. The mode shifts from speed control mode to torque control mode when kick-down in activated, and back to speed control mode when reverse gear is activated.

The prime mover 10 is for instance an internal combustion engine. As an alternative, the mover could be an electric motor as part of a series hybrid system. A further alternative is a prime mover being a combination of an internal combustion engine and an electric motor connected in parallel in a parallel hybrid system. The electric motor (EM) and the internal combustion engine (ICE) are then mechanically connected to the same drive shaft with possibly a gear reduction downstream of either the ICE or the EM or both.

Figure 4:
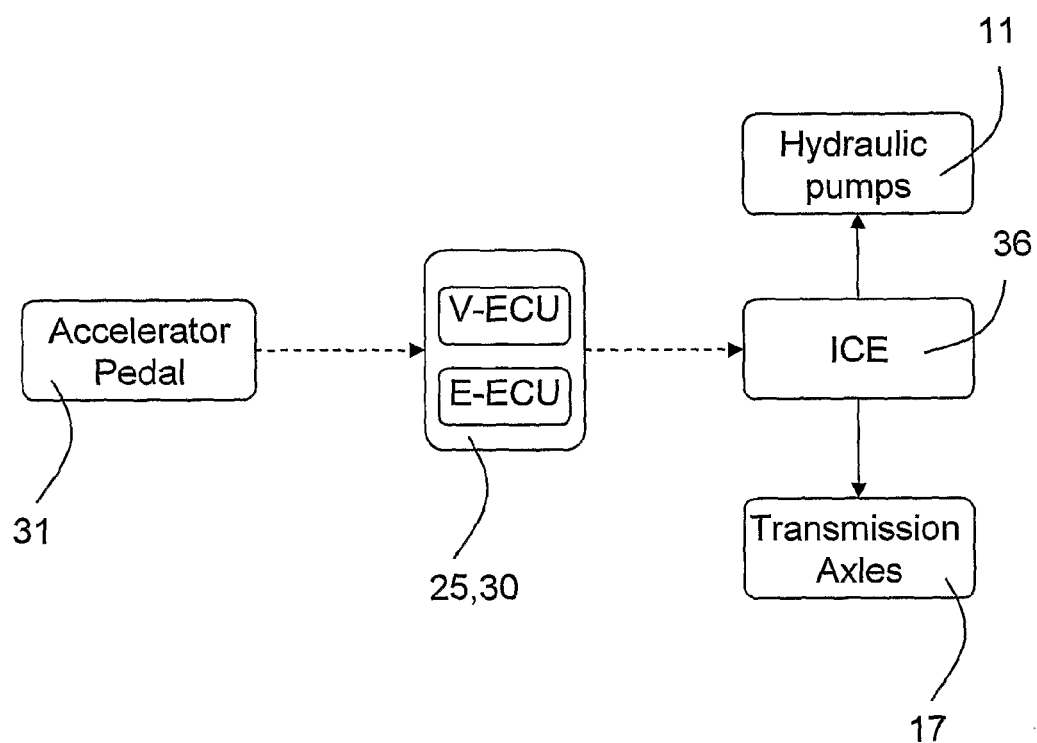
FIG. 4 illustrates the control of a conventional internal combustion engine connected to the transmission axles and the hydraulic pumps.
Figure 5:
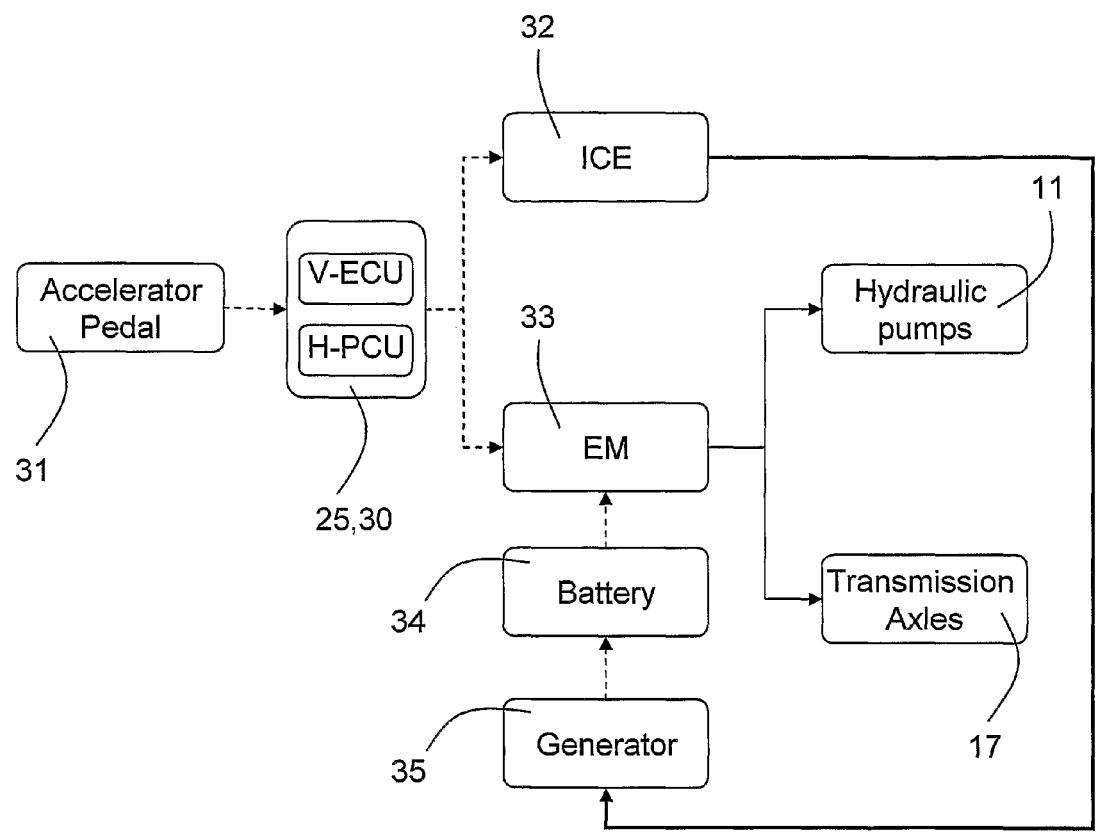
FIG. 5 illustrates the control of a series hybrid system with the electric motor(s) connected to the transmission axles and the hydraulic pumps.
Figure 6:
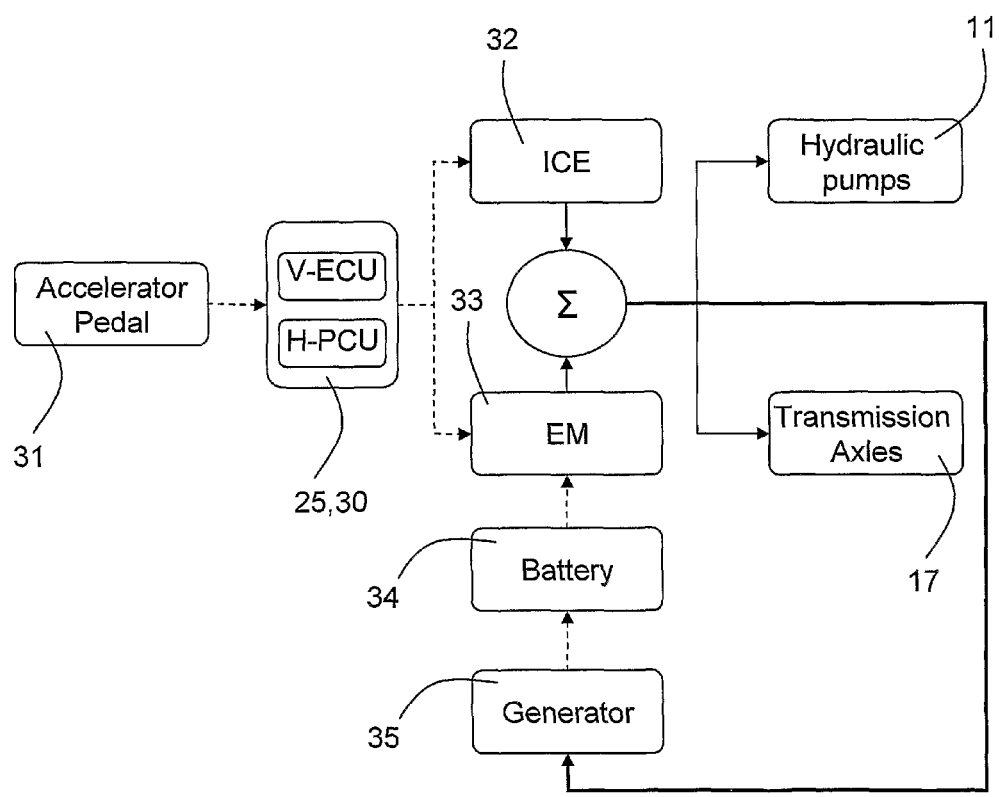
FIG. 6 illustrates the control of a parallel hybrid system with the electric motor and the internal combustion engine both mechanically connected to the transmission axles and the hydraulic pumps.

FIGS. 4-6 illustrate these types of prime movers. In all figures, the angle of the accelerator pedal angle results in a voltage (or current) value which is converted into a figure and then fed into e.g. the E-ECU 25. In the hybrid systems, the E-ECU is replaced by a Hybrid Power Control Unit (H-PCU). The E-ECU/H-PCU is connected to a vehicle control system controlled by the V-ECU 30. These designations and particular arrangement of electronic control units in order to control the vehicle are to be regarded as an example only. A person skilled in the art can easily find variations that fulfil the same principal function.

In the series hybrid system of FIG. 5, the internal combustion engine (ICE) 32 drives an electric generator 35 for charging a battery 34 or any other electric power storage unit. The H-PCU controls the ICE 32 to make sure that the electric motor (EM) 33 has enough electric power for driving the traction system. As mentioned, there is no torque converter 12 present, i.e. the EM is directly mechanically connected to the transmission and axles 17. As illustrated in FIG. 5, the same EM may also drive the hydraulic pumps; however it is preferred to install at least one additional EM for this purpose.

In the parallel hybrid system of FIG. 6, the ICE 32 and the EM 33 together drive the traction system and the hydraulic pumps. The power of the two power sources are summarized and fed both to the systems and the generator 35. Also here, the hydraulic pumps may be driven by at least one additional EM, which would also give a decoupling effect.

Figure 10:
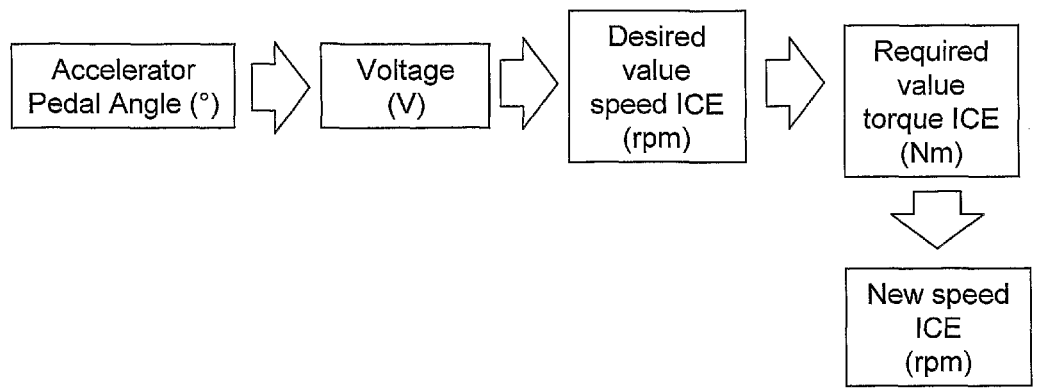
FIG. 10 illustrates a flow chart for variable-speed control of the engine in a system according to FIG. 4.
Figure 11:
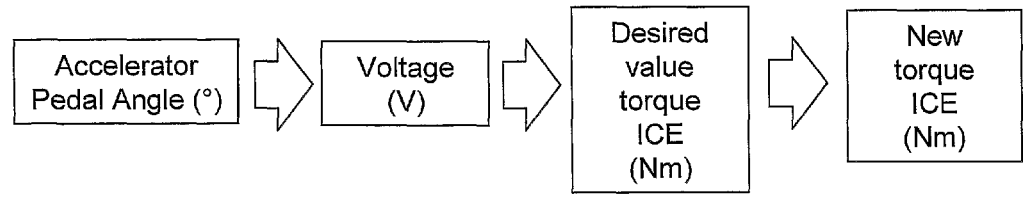
FIG. 11 illustrates a flow chart for torque control of the engine in a system according to FIG. 4.

When the prime mover is an internal combustion engine 32, the selected control mode controls the internal combustion engine. FIGS. 10-11 illustrate the switch of control mode in such a loader. In these figures and in FIGS. 12-16 the operator control input is exemplified by a voltage and the operation signal by a desired value of speed or torque. The internal combustion engine 32 is indicated by ICE and the electric motor 33 is indicated by EM.

FIG. 10 represents the situation according to step 41 in FIG. 8. The engine is speed controlled. The voltage is then interpreted as a speed control value, and the E-ECU sets a desired speed value, which is converted to a required torque value. The required torque value is then controlled to keep the desired speed. FIG. 11 represents the situation according to step 43 in FIG. 8. When the loader switches or operates with active kick-down, the loader shifts to a torque control mode. In this mode, the voltage is interpreted as a torque control value and the E-ECU sets the desired torque value which depending on the acting load will result in a certain speed.

Figure 12:
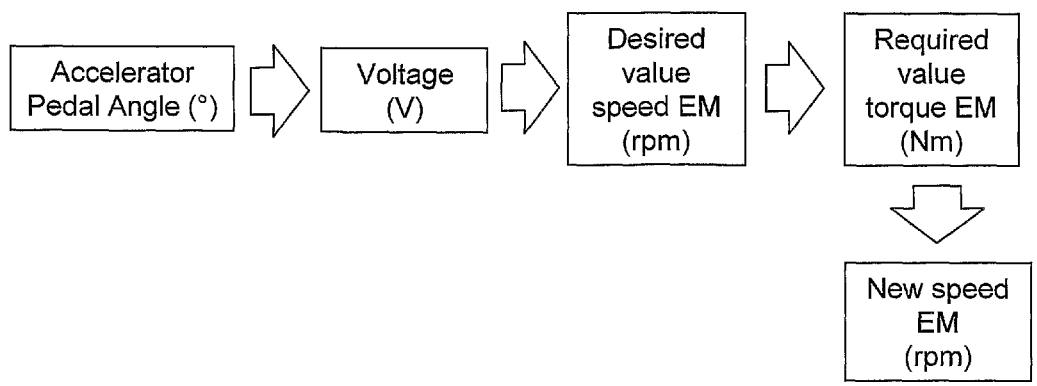
FIG. 12 illustrates a flow chart for variable-speed control of the electric motor in a system according to FIG. 5.
Figure 13:
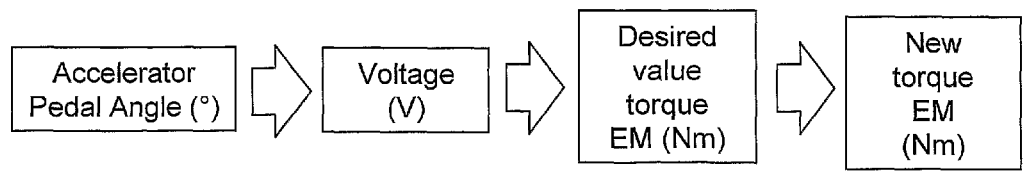
FIG. 13 illustrates a flow chart for torque control of the electric motor in a system according to FIG. 5.

FIGS. 12-13 illustrate the same situation as FIGS. 10-11, with the only difference that the speed control mode and the torque control mode is adapted for controlling an electric motor 33, see FIG. 5. The selected control mode then controls the electric motor. If it is a series hybrid system, the internal combustion is controlled separately for providing enough power to the system and/or the battery.

Figure 14:
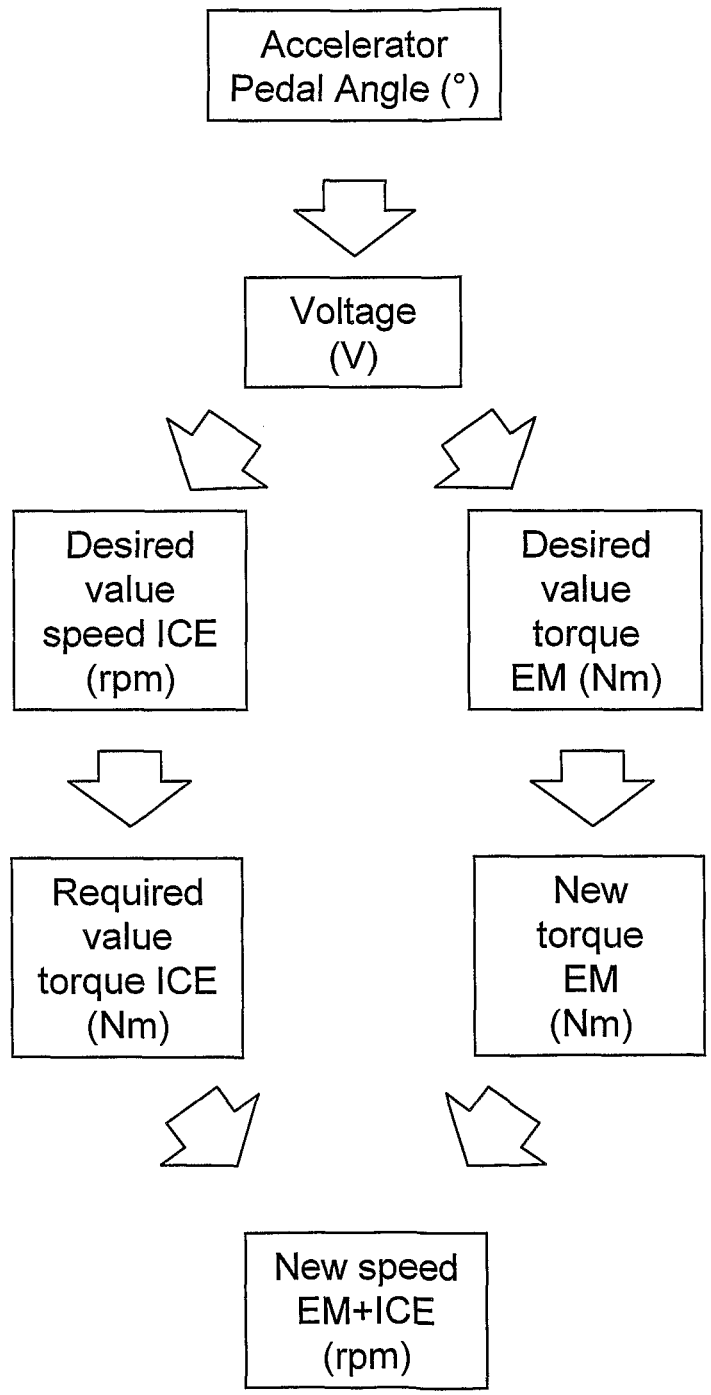
FIG. 14 illustrates a flow chart for variable-speed control of the internal combustion engine and torque control of the electric motor in a system according to FIG. 6.
Figure 15:
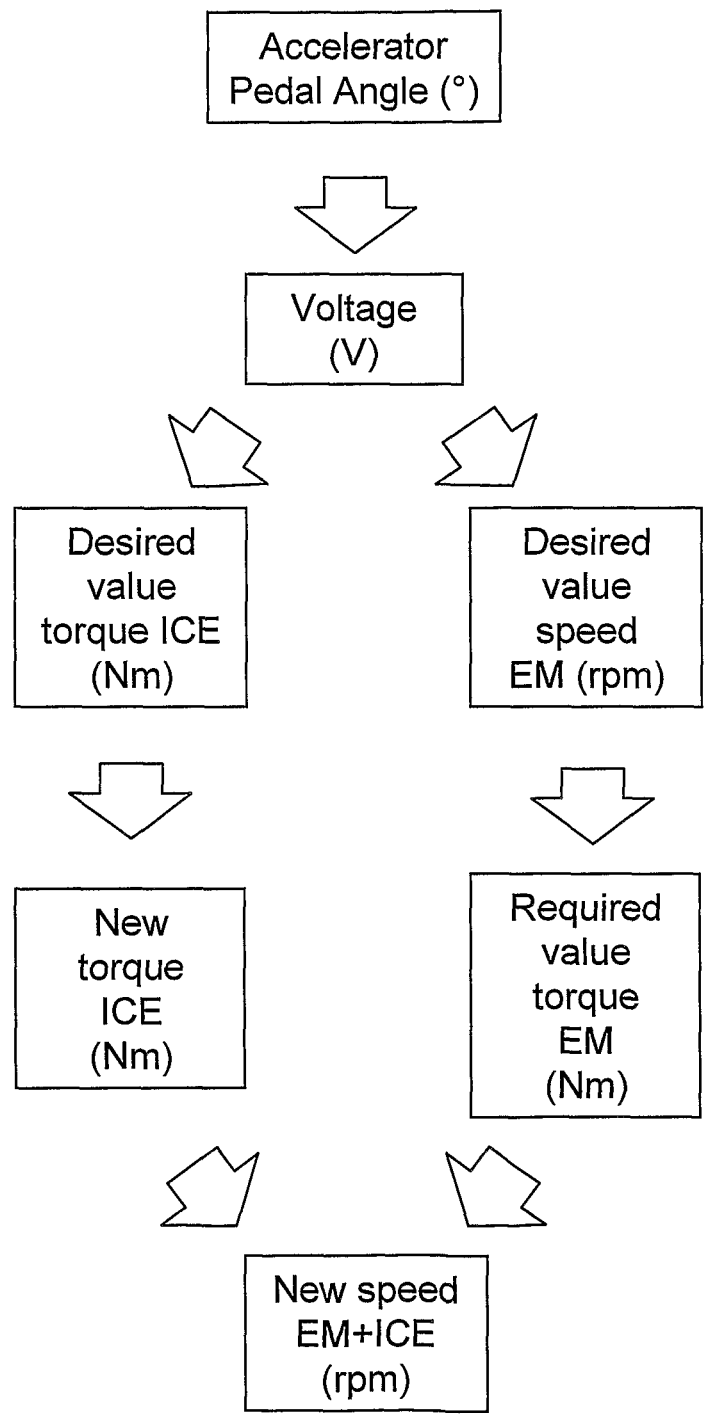
FIG. 15 illustrates a flow chart for variable-speed control of the electric motor and torque control of the internal combustion engine in a system according to FIG. 6.
Figure 16:
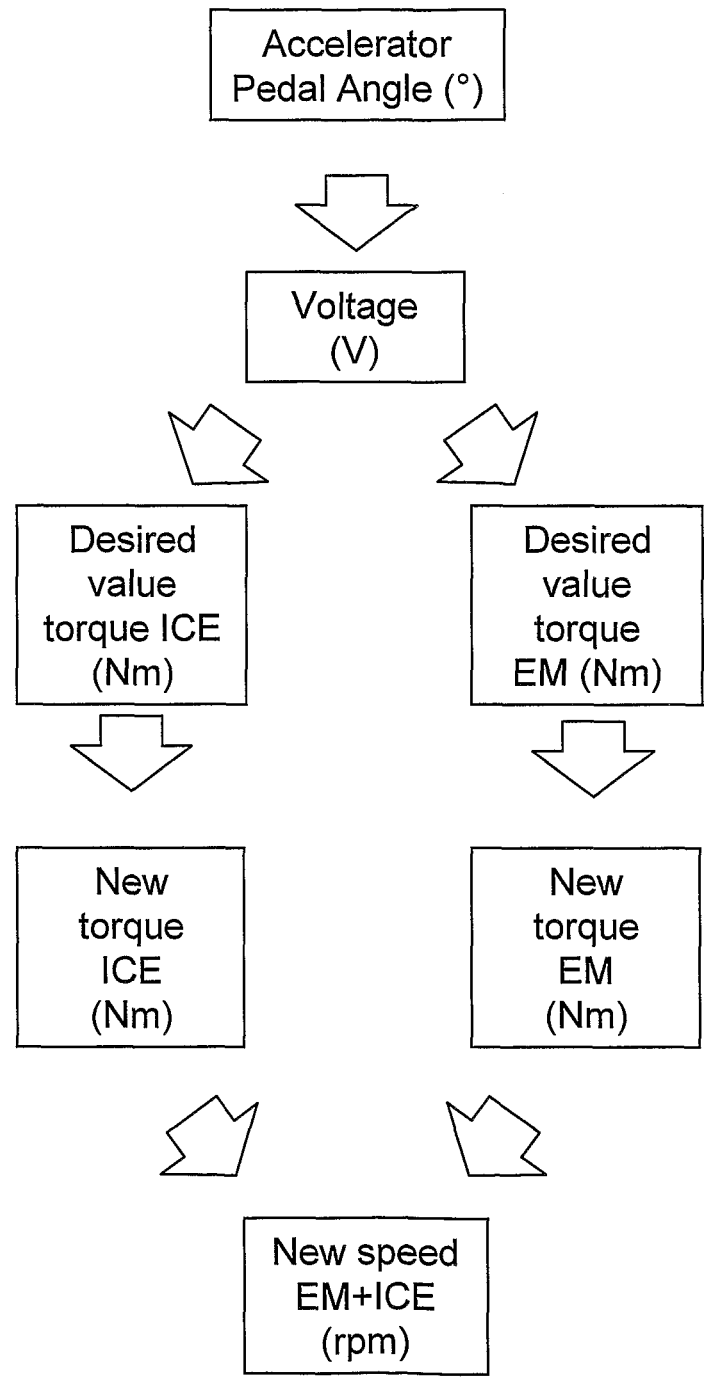
FIG. 16 illustrates a flow chart for torque control of both the electric motor and the internal combustion engine in a system according to FIG. 6.

FIGS. 14-16 illustrate the situation in a parallel hybrid system, see FIG. 6. FIGS. 14 and 15 show the situation according to step 41 in FIG. 10. In FIG. 14, the internal combustion engine is operated in a speed control mode while the electric motor is operated in torque control mode. In FIG. 15 the EM is operated in a speed control mode and the ICE in torque control mode. Since the engine and the motor are connected in parallel, the speed controlled unit (EM or ICE) will make sure to keep the speed constant, while the other unit contributes with torque.

For the speed-controlled unit, the voltage is interpreted as a speed control value, and the E-ECU/H-PCU sets a desired speed value, which is converted to a required torque value. The required torque value is then controlled to keep the required speed. For the torque-controlled unit, the voltage is interpreted as a torque control value and the E-ECU/H-PCU sets a desired torque value. In a parallel hybrid system, the torque contributions of both units are summarized and lead together with the actual load to a certain speed value.

FIG. 16 represents the situation according to step 43 in FIG. 8. When the loader switches or operates in the kick-down state, both units, internal combustion engine and electric motor are set to a torque control mode.

As mentioned earlier, the engine control unit (E-ECU) 25 or the hybrid control unit (H-PCU) may be adapted to perform any of the method steps described earlier. The unit is then part of a vehicle control system 30 being part of a working machine 1, such as the wheel loader. The designations and particular arrangement of electronic control units in order to control the vehicle are to be regarded as an example only. A person skilled in the art can easily find variations that fulfil the same principal function. For instance, as is the case for E-ECU, the T-ECU could also be realized as functionality within any other ECU, e.g. the vehicle ECU.

The invention claimed is:

1. A method for controlling a prime mover adapted to drive at least one ground engaging element of a working machine, comprising the steps of
receiving an operator control input indicative of the control of the prime mover,
determining at least one operation signal in response to the operator control input, which operation signal is sent for controlling the prime mover,
receiving an operating state input indicative of an operating state of the working machine, and
selecting a control mode in response to the operating state input, from at least one speed control mode, in which mode the determined operational signal comprises a desired speed of the prime mover, and at least one torque control mode, in which mode the determined operational signal comprises a desired torque of the prime mover,
shifting the control mode from the torque control mode to the speed control mode when the machine switches to a reverse gear operating state.

2. A method according to claim 1 wherein the control mode is shifted from the speed control mode to the torque control mode when the machine switches to a kick-down operating state.

3. A method according to claim 1 comprising the step of selecting between a plurality of speed control modes, the plurality of speed control modes comprising the at least on speed control mode, and a plurality of torque control modes, the plurality of torque control modes comprising the at least one torque control mode.

4. A method according to claim 1 wherein each control mode comprises at least one control map for determining the operation signal.

5. A method according to claim 1 wherein in the torque control mode the actual value for the speed of the prime mover at least depends on a load acting on the machine.

6. A method according to claim 1 wherein the prime mover is an internal combustion engine.

7. A method according to claim 6 wherein the selected control mode controls the internal combustion engine.

8. A method according to claim 1 wherein the prime mover is an electric motor.

9. A method according to claim 8 wherein the electric motor is part of a series hybrid system.

10. A method according to claim 8 wherein the selected control mode controls the electric motor.

11. A method according to claim 1 wherein the prime mover is a parallel hybrid system with an internal combustion engine and an electric motor connected in parallel.

12. A method according to claim 1 wherein the operating state input is determined by the operator's actuation of a control device for selection of different operating states.

13. A method according to claim 12 wherein the control device comprises a kick-down button.

14. A method according to claim 1 wherein the operating state input is determined automatically based on at least one detected operating condition.

15. An engine control unit or a hybrid control unit being adapted to perform any of the method steps according to claim 1.

16. A vehicle control system comprising at least one unit according to claim 15.

17. A working machine comprising a vehicle control system according to claim 16.

* * * * *